Dec. 20, 1966 HANS-JOACHIM HEINRICH 3,293,399

PRINTED CIRCUIT CONTACT ARRANGEMENT

Filed March 12, 1965 2 Sheets-Sheet 1

HANS-JOACHIM HEINRICH
INVENTOR.

BY

Attorney

HANS-JOACHIM HEINRICH
INVENTOR.

BY

Karl G. Ross
Attorney

United States Patent Office 3,293,399
Patented Dec. 20, 1966

3,293,399

PRINTED CIRCUIT CONTACT ARRANGEMENT

Hans-Joachim Heinrich, Oldenburg, Germany, assignor to Balco Filtertechnik G.m.b.H., Braunschweig, Germany, a corporation of Germany Filed Mar. 12, 1965, Ser. No. 439,155
6 Claims. (Cl. 200—166)

My present invention relates to a printed circuit contact arrangement, more particularly to a contact bank of this type adapted to be used in an electric switch also including a wiper designed to sweep across the contacts thereof.

Printed circuits are generally made by coating a suitable base of insulation material with a metallic layer and then etching or otherwise eroding selected portions of this layer to leave an array of conductor strips projecting from the base surface. As long as these conductors serve only as fixed terminals or other circuit elements (e.g. condenser plates) not subject to engagement by movable parts, this technique is entirely satisfactory. Problems are encountered, however, when the conductors are to be used as bank contacts of a switch (e.g. of the rotary type) or are otherwise to cooperate with relatively movable counterelements. Thus, a rotating switch wiper of the nonbridging type will have to move alternately over the surface of the insulating base material and over the tops of the raised conductor strips so that its motion will be uneven and will subject both the wiper and the contacts to severe lateral stresses. If, as is customary, the contacts are silvered or otherwise provided with a wear-resistant metallic coating, the latter may be chipped or peeled off under the impact of the oncoming wiper. Moreover, the insulating materials most commonly used for the base or carrier (e.g. laminates of phenolic resins with glass or cellulosic fibers) are generally not endowed with those properties, such as low frictional resistance, which are most desirable in a contact bank for rotary switches and the like.

It is, therefore, the general object of my present invention to provide an improved printed circuit adapted to be used in a rotary switch or similar electrical device with avoidance of the aforestated drawbacks.

It is also an object of this invention to provide a convenient method of making an improved printed circuit of this type.

In accordance with the present invention, I provide an insulating covering of thermosetting material which adheres to the base of the printed circuit and forms inlays occupying the spaces between conductor strips projecting therefrom, this covering entering into contact with the flanks of adjoining strips and rising to substantially the level of their exposed surfaces at least in the immediate vicinity of the strips.

When the spaces between the projecting conductor strips or contact elements are thus filled with an insulating mass, a substantially continuous path is provided for a wiper sliding over these contacts. Moreover, this covering also protects the flanks of the conductor strips which, therefore, can be plated or otherwise provided with a wear-resistant coating of high conductivity without danger of chipping or peeling. Depending upon the nature of the insulating mass, and upon the effect sought to be achieved, the inlays may be level with the conductors, may bulge between the conductors above their level or may be depressed therebetween. They may also adjoin the conductors in a continuous manner or be separated from them by narrow gaps; such gaps may be useful as collectors for dust and grit or may serve as a repository for a contact-cleaning agent or a lubricant.

If the inlays are to be level with the conductor surfaces, a convenient manufacturing method according to a feature of my invention is to apply the thermosetting mass in its fluid state to the working surface of the entire structure including the conductors, at least within the region in which the bank contacts are located, and to grind off the excess after hardening, the grinding being thus carried down to the level of the contact surfaces.

In some instances, as where the contacts are separated by relatively wide areas of insulating material, it will be convenient to give a certain concavity to the inlay in order to relieve the frictional resistance encountered by the wiper in its movement across the dielectric mass. In such a case it will be useful to choose as the thermosetting material a substance which shrinks upon hardening and/or has a low surface tension in its fluid state in order to form a meniscus along its surface; this may be an inorganic composition such as a heat-hardenable solution of ethyl silicate and glass with a filler of alumina which is available under the commercial designation W.M.F. 29. On the other hand, there are situations in which the opposite (i.e. bulging) configuration of the intervening covering will be desirable, as where a rapid lifting of the wiper off its contact is important as it passes beyond its aligned position. In the latter case, the mass may consist of any of several thermosetting plastics, e.g., epoxy resins, phenol formaldehyde condensation products or polyisoxyanates, characterized by a high surface tension in its fluid state so that the convex shape of its surface will develop automatically upon setting.

The invention will be described hereafter in greater detail, reference being made to the accompanying drawing in which.

Figure 1:
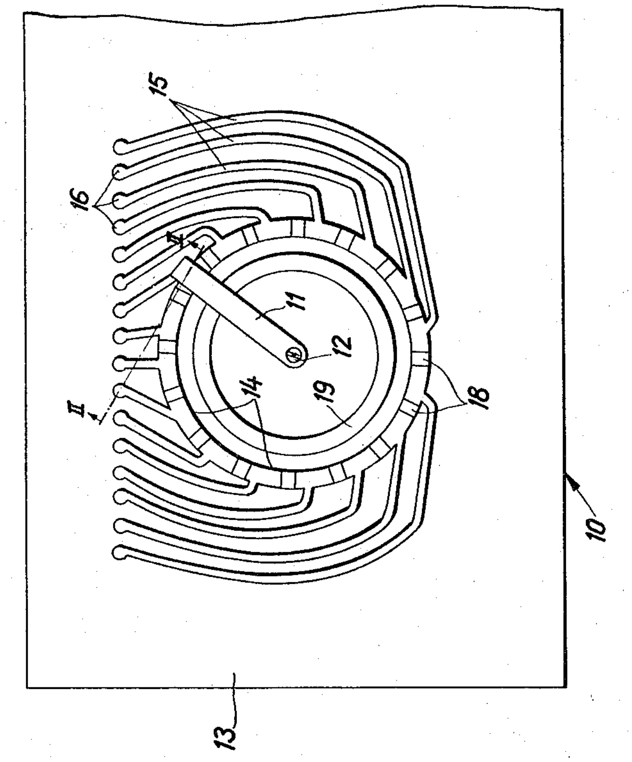
FIG. 1 is a plan view of a rotary switch including a printed-circuit contact bank according to the invention.

In FIG. 1 I have shown a rotary switch including a contact bank 10 and a rotary wiper 11 having a shaft 12 driven by any suitable mechanism not shown. Bank 10, as more clearly seen in FIG. 2, comprises an insulating base 13 serving as a carrier for a number of fixed contacts 14 disposed in a circular array about the axis of shaft 12; the contacts 14 are part of respective conductor strips 15 whose opposite extremities 16 form terminals designed to be connected, e.g., by soldering, to an external circuit.

The strips 15 with their contact portions 14 and terminal portions 16, which may consist of copper foil, are plated along their exposed surfaces so that a highly conductive continuous coating 17 resistant to wear and erosion is formed on their upper surfaces and lateral flanks. The spaces between adjoining bank contacts 14 are occupied by inlays 18 of thermosetting dielectric material which is level with the plated conductors 15 but is confined to the region of the annular array of bank contacts 14. Thus, the spaces between the remaining portions of strip 15, as well as the clearance between the array of contacts 14 and a ring electrode 19 also engaged by wiper 11, are left free of the mass 18.

Figure 2:
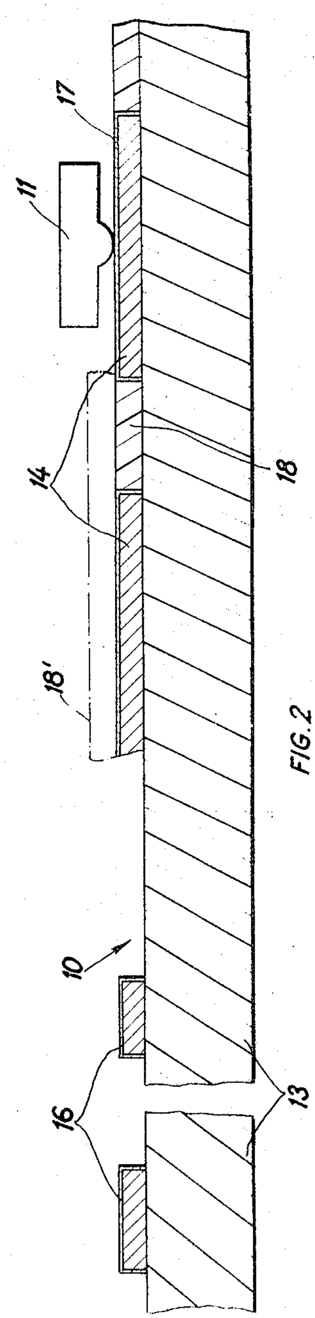
FIG. 2 is an enlarged fragmentary cross-sectional view taken on the line II—II of FIG. 1.

As indicated in dot-dash lines in FIG. 2, the thermosetting substance may be deposited in its fluid state to a level 18', thus above the contacts 14, and may be subsequently ground off, after hardening, to leave the solid inserts 18.

Figure 3:
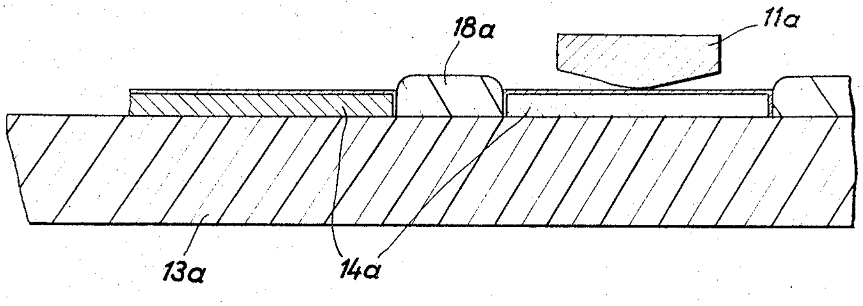
FIG. 3 is a cross-sectional view generally similar to FIG. 2, showing a modification.

According to FIG. 3, the inlays **18*a* on base 13*a* between contacts 14*a* are raised in order that the wiper 11*a*** may be lifted rapidly off the conductor surface when passing from one contact to the next.

Figure 4:
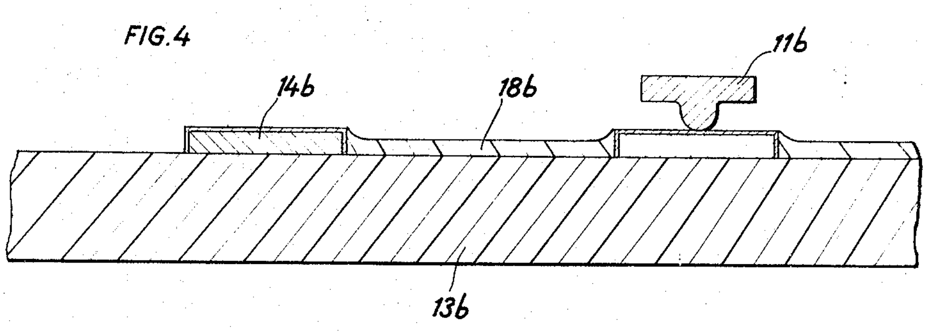
FIGS. 4 and 5 are views analogous to FIG. 3, illustrating two further embodiments.

In FIG. 4, on the other hand, base 13*b* carries inlays 18*b* whose concave shape between conductors 14*b* reduces the frictional resistance encountered by the wiper 11*b* in its passage from one contact to the next.

Figure 5:
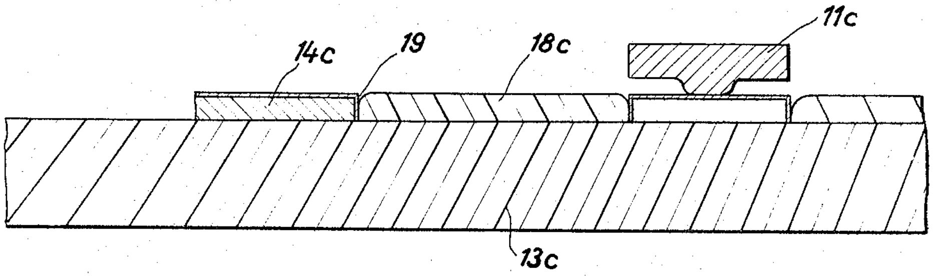

In FIG. 5, finally, inlays 18*c* on base 13*c*, shown level with contacts 14*c*, are separated therefrom by narrow gaps 19 which are bridged by a wiper 11*c* as it slides across the junction, these gaps 19 serving to collect impurities swept off the conductor surfaces by the wiper.

It may be mentioned that the insulating material forming the inlays 18, 18*a*, 18*b*, 18*c* will also exert a certain polishing effect upon the underside of the wiper so as to improve its electrical conductivity. To this effect, the thermosetting material may be given a slightly abrasive character and/or may be raised more prominently above the conductor surfaces in the general manner illustrated in FIG. 3.

My invention is, of course, not limited to the specific configurations described and illustrated, nor to the materials and compositions mentioned by way of example, but may be realized in various modifications without departing from the spirit and scope of the appended claims.

I claim:

1. A printed circuit comprising a nonconductive base, a plurality of conductor strips spacedly carried on a surface of said base and projecting beyond said surface, and an adhering insulating thermosetting filler hardened from a liquid state between said strips and bridging the space therebetween while rising to substantially the level of said strips with a configuration of the junction between the strips and said filler determined by the surface tension of the liquid.

2. An electric contact arrangement comprising a nonconductive base, a plurality of printed bank contacts spacedly carried on a surface of said base and projecting beyond said surface, a wiper displaceable across said surface for successive engagement with said contacts, and an adhering insulating thermosetting filler hardened from the liquid state on said surface bridging the space between said contacts in the path of said wiper and rising to substantially the level of said contacts with a transition configuration at the junction of said filler with said contacts determined by the surface tension of the filler in the liquid state, each of said contacts being provided with a continuous wear-resistant coating on its exposed upper surface and its flank proximal to said filler.

3. An electric contact as defined in claim 2 wherein said filler is level with said contacts.

4. An electric contact arrangement comprising a nonconductive base, a plurality of printed bank contacts spacedly carried on a surface of said base and projecting beyond said surface, a wiper displaceable across said surface for successive engagement with said contacts, and an adhering insulating thermosetting covering on said surface bridging the space between said contacts in the path of said wiper and rising to substantially the level of said contacts, each of said contacts being provided with a continuous wear-resistant coating on its exposed upper surface and its flanks proximal to said covering, said covering rising gradually between said contacts to a level above said exposed surface thereof.

5. An electric contact arrangement comprising a nonconductive base, a plurality of printed bank contacts spacedly carried on a surface of said base and projecting beyond said surface, a wiper displaceable across said surface for successive engagement with said contacts, and an adhering insulating thermosetting covering on said surface bridging the space between said contacts in the path of said wiper and rising to substantially the level of said contacts, each of said contacts being provided with a continuous wear-resistant coating on its exposed upper surface and its flanks proximal to said covering, said covering forming depressions between said contacts and descending gradually from the level of said exposed surface to the bottom of said depressions.

6. An electric contact arrangement comprising a nonconductive base, a plurality of printed bank contacts spacedly carried on a surface of said base and projecting beyond said surface, a wiper displaceable across said surface for successive engagement with said contacts, and an adhering insulating thermosetting covering on said surface bridging the space between said contacts in the path of said wiper and rising to substantially the level of said contacts, each of said contacts being provided with a continuous wear-resistant coating on its exposed upper surface and its flanks proximal to said covering, said covering being separated from said flanks by a narrow gap.

References Cited by the Examiner

UNITED STATES PATENTS

| | | | |
|---|---|---|---|
| 2,616,994 | 11/1952 | Luhn | 200—11 |
| 2,853,564 | 9/1958 | Gahagan | 200—11 |
| 2,909,833 | 10/1959 | Murray et al. | 200—166 |
| 2,958,120 | 11/1960 | Taylor | 174—68.5 X |
| 3,135,823 | 6/1964 | Pritikin | 174—68.5 |
| 3,152,938 | 10/1964 | Osifchin et al. | 156—3 |
| 3,215,574 | 11/1965 | Korb | 156—3 |

ROBERT K. SCHAEFER, *Primary Examiner.*

H. O. JONES, *Assistant Examiner.*